(12) United States Patent
Khoshnevisan et al.

(10) Patent No.: US 11,405,152 B2
(45) Date of Patent: Aug. 2, 2022

(54) QCL RELATIONSHIP AND/OR DMRS PORT IDENTIFICATION

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US); Tao Luo, San Diego, CA (US); Arumugam Chendamarai Kannan, San Diego, CA (US); Vinay Chande, San Diego, CA (US); Makesh Pravin John Wilson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 16/722,989

(22) Filed: Dec. 20, 2019

(65) Prior Publication Data
US 2020/0228263 A1    Jul. 16, 2020

Related U.S. Application Data

(60) Provisional application No. 62/791,232, filed on Jan. 11, 2019.

(51) Int. Cl.
*H04W 4/00* (2018.01)
*H04L 5/00* (2006.01)
(Continued)

(52) U.S. Cl.
CPC .......... *H04L 5/0035* (2013.01); *H04B 7/024* (2013.01); *H04L 5/0023* (2013.01); *H04W 72/1273* (2013.01); *H04W 72/1289* (2013.01)

(58) Field of Classification Search
None
See application file for complete search history.

(56) References Cited

U.S. PATENT DOCUMENTS 10,893,431 B2 *  1/2021  Liou .................... H04W 76/19
10,911,201 B2 *  2/2021  Cheng .............. H04W 72/0413
(Continued)

FOREIGN PATENT DOCUMENTS

EP          3565169 A1    11/2019
WO       2018228233 A1    12/2018

OTHER PUBLICATIONS

International Search Report and Written Opinion—PCT/US2019/068326—ISA/EPO—dated May 19, 2020.
(Continued)

*Primary Examiner* — Phirin Sam
(74) *Attorney, Agent, or Firm* — Harrity & Harrity, LLP

(57) ABSTRACT

Various aspects of the present disclosure generally relate to wireless communication. In some aspects, a user equipment (UE) may receive, from a first transmit receive point in a multi-TRP configuration, a downlink control information (DCI) communication. The UE may identify one or more quasi-co-location (QCL) relationships associated with a control resource set (CORESET) or a search space set in which the DCI communication is received. A QCL relationship, of the one or more QCL relationships, is associated with one or more physical downlink shared channel (PDSCH) layers that are transmitted from a second TRP in the multi-TRP configuration. Numerous other aspects are provided.

30 Claims, 11 Drawing Sheets

800 →

810 — Receive, from a first transmit receive point in a multi-TRP configuration, a downlink control information (DCI) communication 820 — Identify one or more quasi-co-location (QCL) relationships associated with a core resource set (CORESET) or a search space in which the DCI communication is received, wherein a QCL relationship, of the one or more QCL relationships, is associated with one or more physical downlink shared channel (PDSCH) layers that are transmitted from a second TRP in the multi-TRP configuration

(51) Int. Cl.
    *H04B 7/024*    (2017.01)
    *H04W 72/12*    (2009.01)

(56) References Cited

U.S. PATENT DOCUMENTS

| | | | |
|---|---|---|---|
| 10,951,383 B2* | 3/2021 | Lu | H04W 24/08 |
| 2018/0219606 A1 | 8/2018 | Ng et al. | |
| 2018/0343653 A1* | 11/2018 | Guo | H04W 72/1273 |
| 2019/0069285 A1* | 2/2019 | Chandrasekhar | H04B 7/0695 |
| 2019/0253308 A1* | 8/2019 | Huang | H04B 7/0695 |
| 2019/0274169 A1* | 9/2019 | Tsai | H04B 7/088 |
| 2019/0297603 A1* | 9/2019 | Guo | H04B 7/0695 |
| 2019/0357092 A1* | 11/2019 | Jung | H04W 36/0055 |
| 2019/0379506 A1* | 12/2019 | Cheng | H04W 4/02 |
| 2020/0029316 A1* | 1/2020 | Zhou | H04W 74/0833 |
| 2020/0053757 A1* | 2/2020 | Bagheri | H04W 24/08 |
| 2020/0100193 A1* | 3/2020 | Cheng | H04W 52/146 |
| 2020/0153581 A1* | 5/2020 | Tsai | H04B 7/0691 |
| 2020/0154467 A1* | 5/2020 | Gong | H04W 24/08 |
| 2020/0177254 A1* | 6/2020 | Lee | H04B 7/063 |
| 2020/0204312 A1* | 6/2020 | Xu | H04L 27/2602 |
| 2020/0280409 A1* | 9/2020 | Grant | H04L 5/0023 |
| 2020/0288479 A1* | 9/2020 | Xi | H04B 7/02 |

OTHER PUBLICATIONS

Partial International Search Report—PCT/US2019/068326—ISA/EPO—dated Mar. 18, 2020.

* cited by examiner

QCL RELATIONSHIP AND/OR DMRS PORT IDENTIFICATION

CROSS-REFERENCE TO RELATED APPLICATION

This application claims priority to U.S. Provisional Patent Application No. 62/791,232, filed on Jan. 11, 2019, entitled "QCL RELATIONSHIP AND/OR DMRS PORT IDENTIFICATION," which is hereby expressly incorporated by reference herein.

TECHNICAL FIELD

Aspects of the technology described below generally relate to wireless communication, and to techniques and apparatuses for quasi-co-location (QCL) relationship and/or demodulation reference signal (DMRS) port identification. Some techniques and apparatuses described herein enable and provide wireless communication devices and systems configured for enhanced flexibility in indicating QCL relationships and/or DMRS ports.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

In some aspects, a method of wireless communication, performed by a user equipment (UE), may include receiving, from a first transmit receive point (TRP) in a multi-TRP configuration, a downlink control information (DCI) communication. The method may include identifying one or more quasi-co-location (QCL) relationships associated with a control resource set (CORESET) or a search space set in which the DCI communication is received, wherein a QCL relationship, of the one or more QCL relationships, is associated with one or more physical downlink shared channel (PDSCH) layers that are transmitted from a second TRP in the multi-TRP configuration.

In some aspects, a UE for wireless communication may include memory and one or more processors operatively coupled to the memory. The memory and the one or more processors may be configured to receive, from a first transmit receive point in a multi-TRP configuration, a DCI communication. The memory and the one or more processors may be configured to identify one or more QCL relationships associated with a CORESET or a search space set in which the DCI communication is received, wherein a QCL relationship, of the one or more QCL relationships, is associated with one or more physical PDSCH layers that are transmitted from a second TRP in the multi-TRP configuration.

In some aspects, a non-transitory computer-readable medium may store one or more instructions for wireless communication. The one or more instructions, when executed by one or more processors of a UE, may cause the one or more processors to receive, from a first transmit receive point in a multi-TRP configuration, a DCI communication. The one or more instructions, when executed by one or more processors of a UE, may cause the one or more processors to identify one or more QCL relationships associated with a CORESET or a search space set in which the DCI communication is received, wherein a QCL relationship, of the one or more QCL relationships, is associated with one or more PDSCH layers that are transmitted from a second TRP in the multi-TRP configuration.

In some aspects, an apparatus for wireless communication may include means for receiving, from a first transmit receive point in a multi-TRP configuration, a DCI communication. The apparatus may include means for identifying one or more QCL relationships associated with a CORESET or a search space set in which the DCI communication is received, wherein a QCL relationship, of the one or more QCL relationships, is associated with one or more PDSCH layers that are transmitted from a second TRP in the multi-TRP configuration.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description is provided herein, with some aspects of the disclosure being illustrated in the appended drawings. However, the appended drawings illustrate only some aspects of this disclosure and are therefore not to be considered limiting of the scope of the disclosure. The same reference numbers in different drawings may identify the same or similar elements.

DETAILED DESCRIPTION

Figure 1:
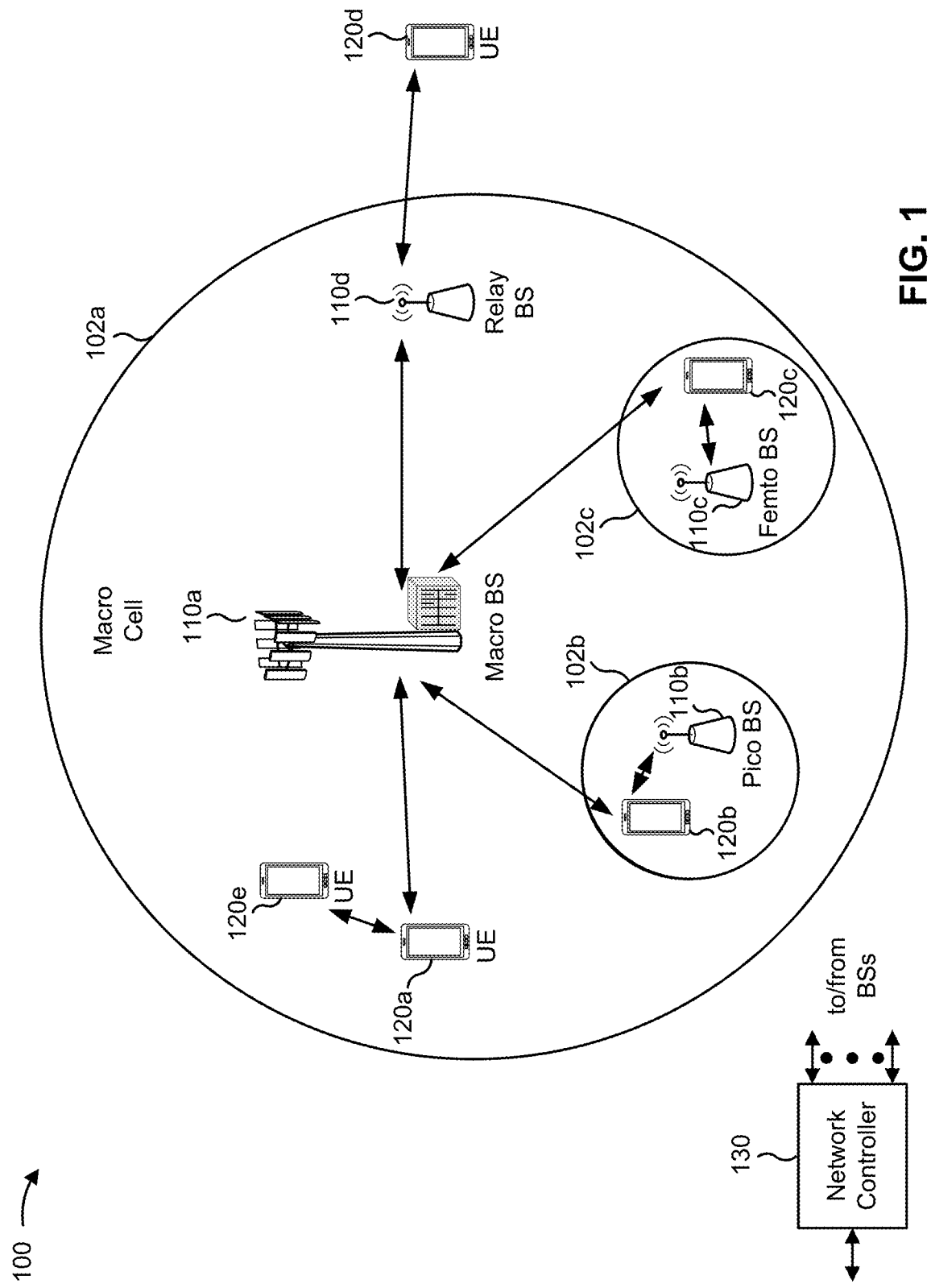
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a wireless network 100 in which aspects of the present disclosure may be practiced. The wireless network 100 may be an LTE network or some other wireless network, such as a 5G or NR network. Wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
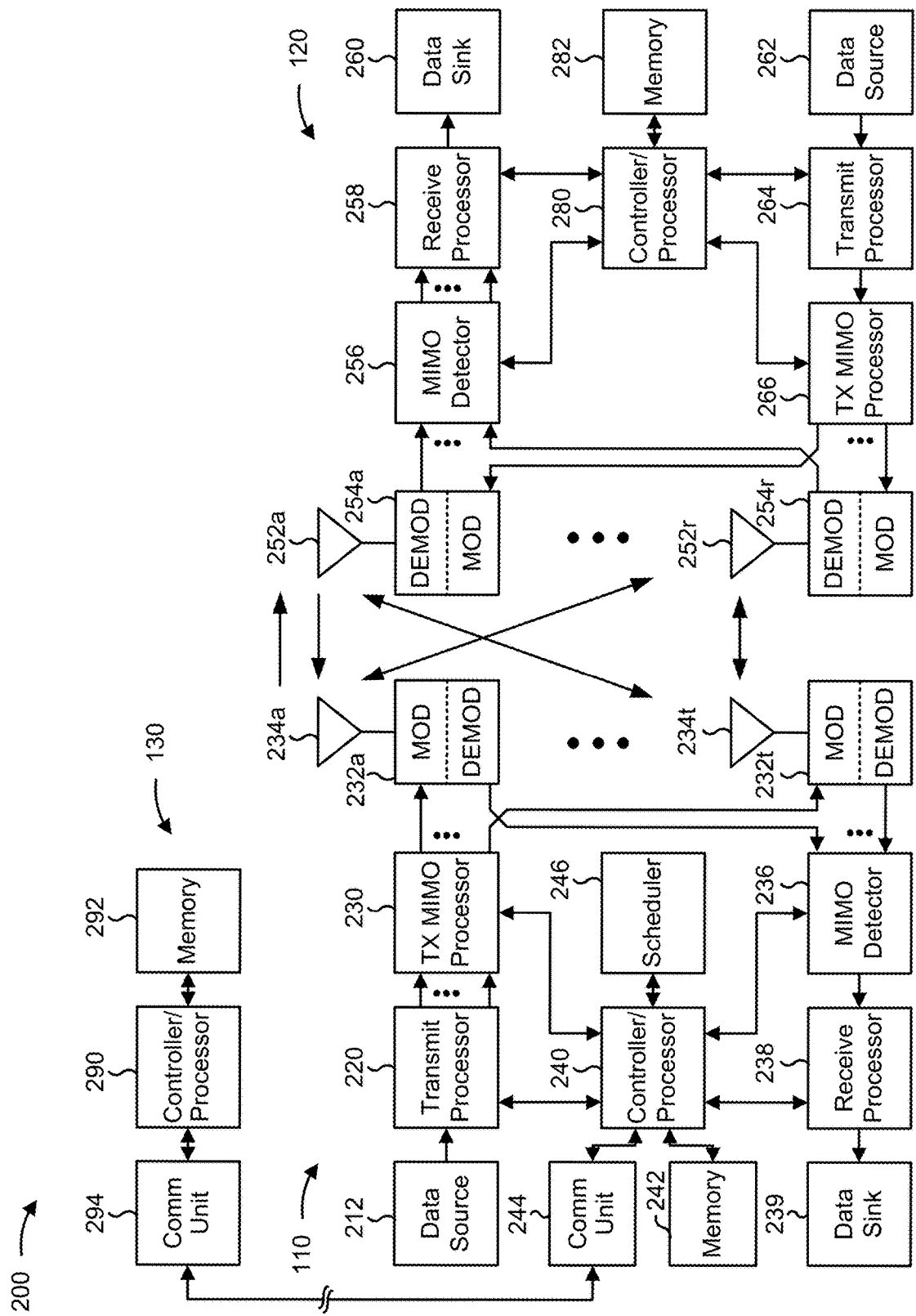
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with quasi-co-location (QCL) relationship and/or demodulation reference signal (DMRS) port identification, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving, from a first transmit receive point (TRP) in a multi-TRP configuration, a downlink control information (DCI) communication, means for identifying one or more QCL relationships associated with a control resource set (CORESET) or a search space set in which the DCI communication is received, wherein a QCL relationship, of the one or more QCL relationships, is associated with one or more physical downlink shared channel (PDSCH) layers that are transmitted from a second TRP in the multi-TRP configuration, and/or the like. In some aspects, such means may include one or more components of UE 120 described in connection with FIG. 2, such as antenna 252, DEMOD 254, MOD 254, MIMO detector 256, receive processor 258, transmit processor 264, TX MIMO processor 266, controller/processor 280, and/or the like.

As indicated above, FIG. 2 is provided merely as an example. Other examples may differ from what is described with regard to FIG. 2.

Figure 3A:
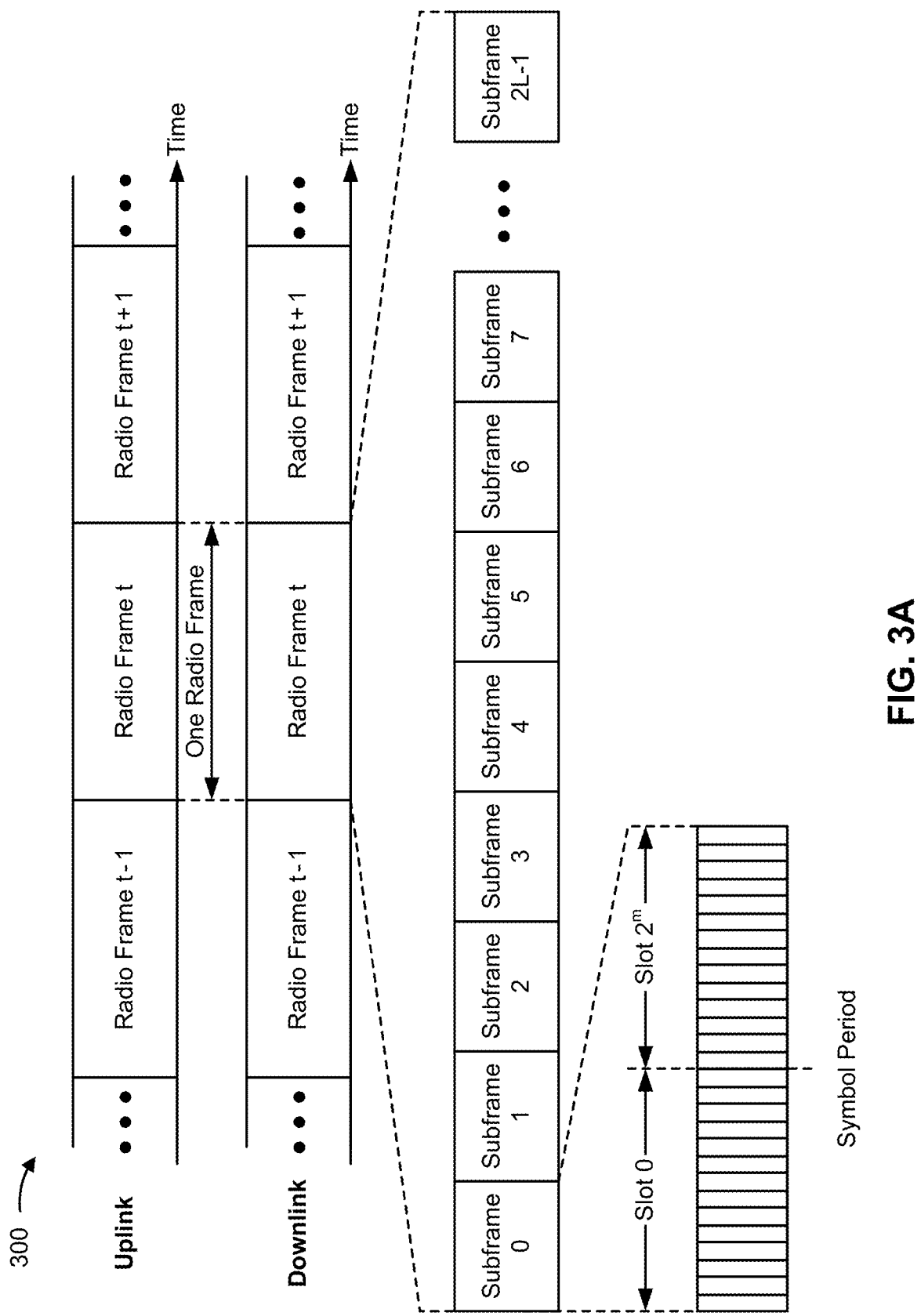
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
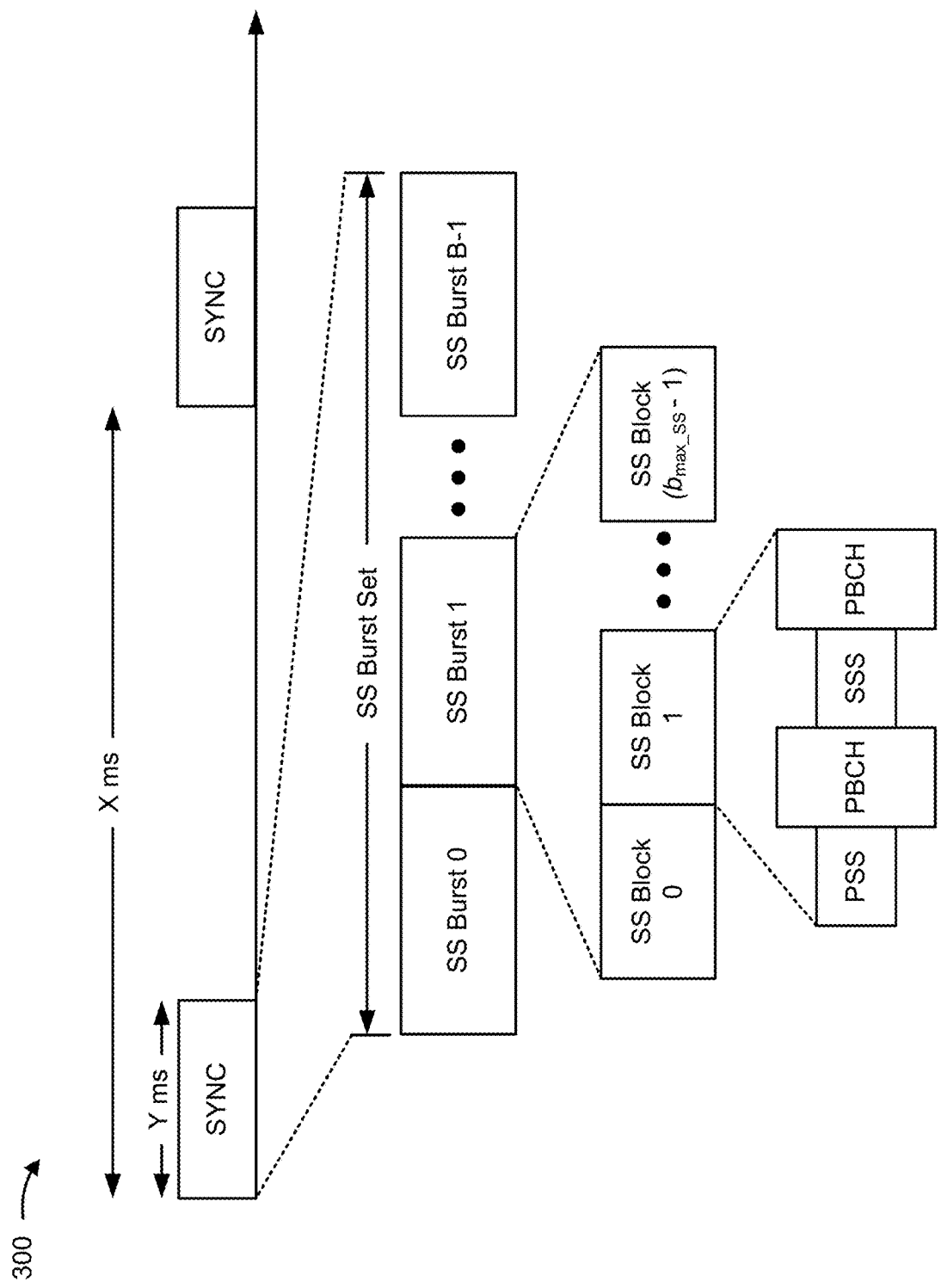
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
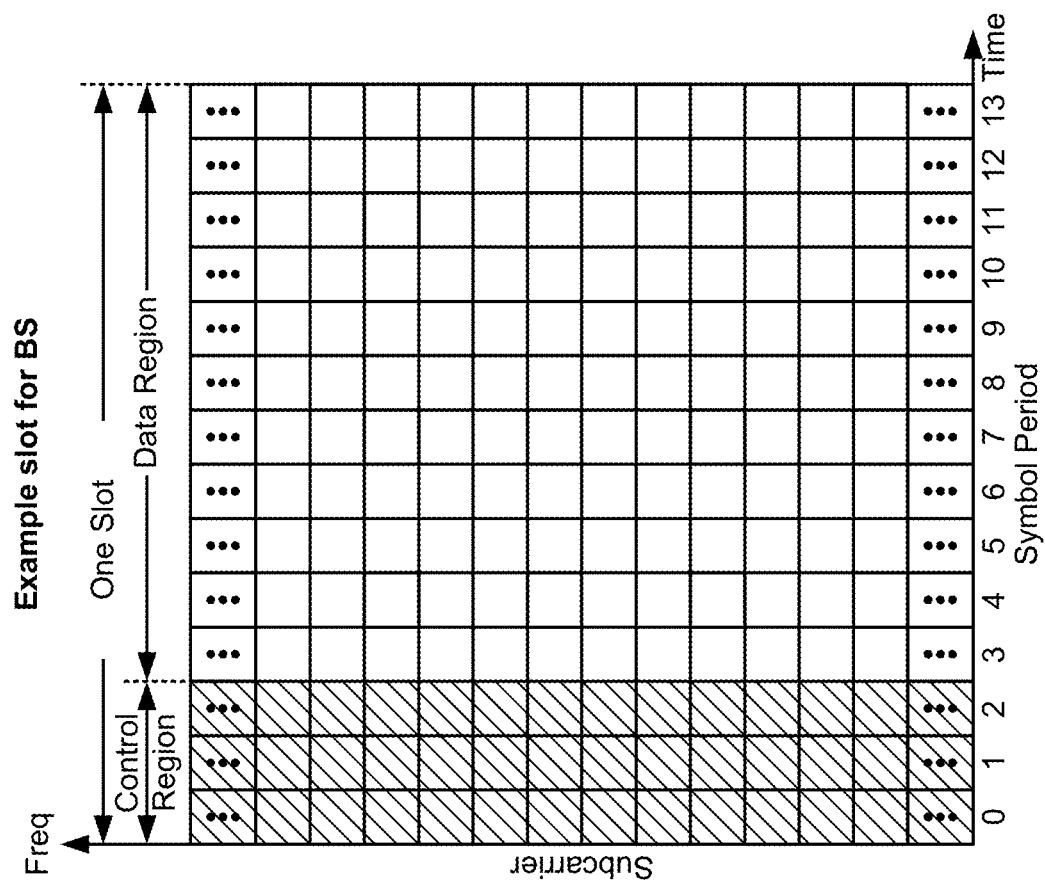
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
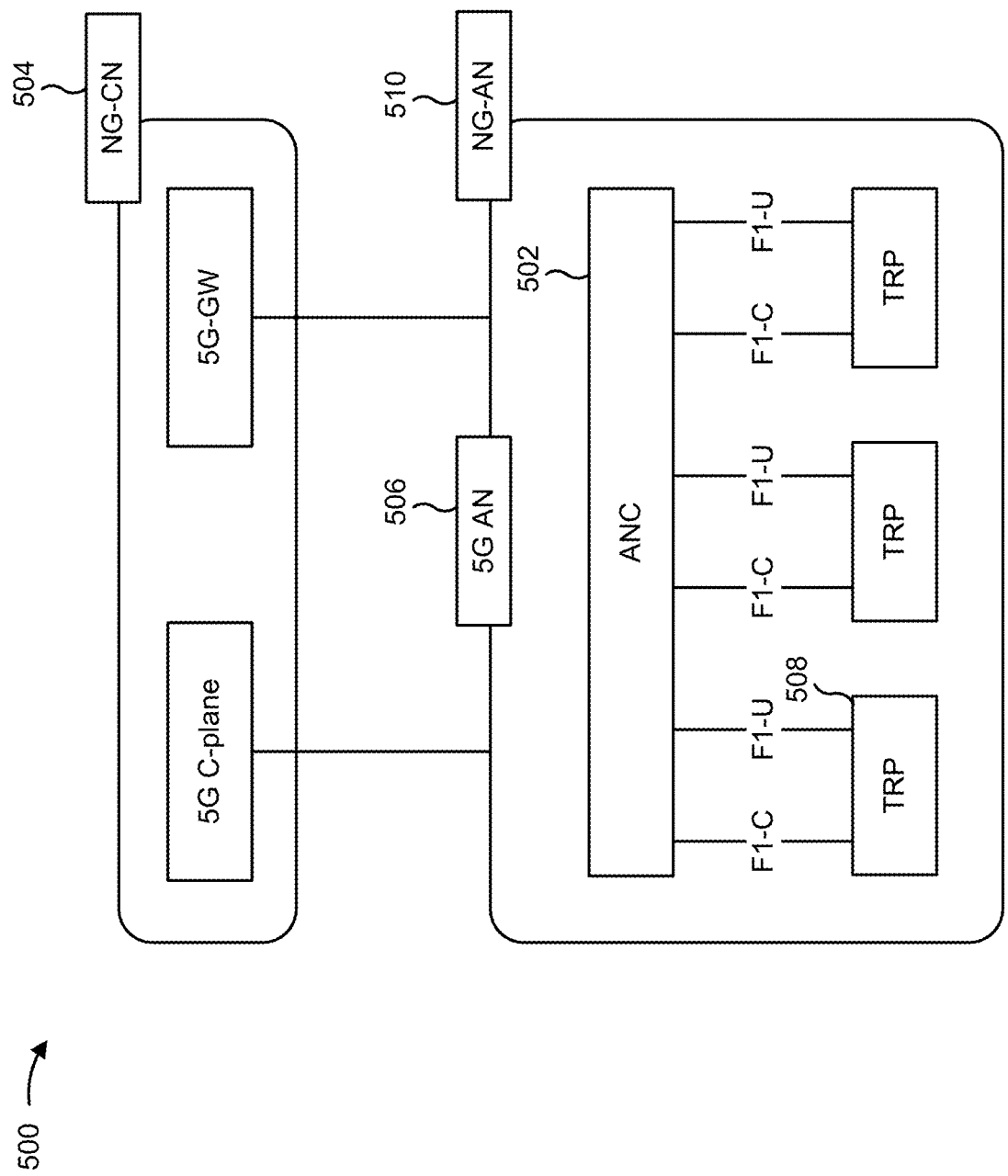
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
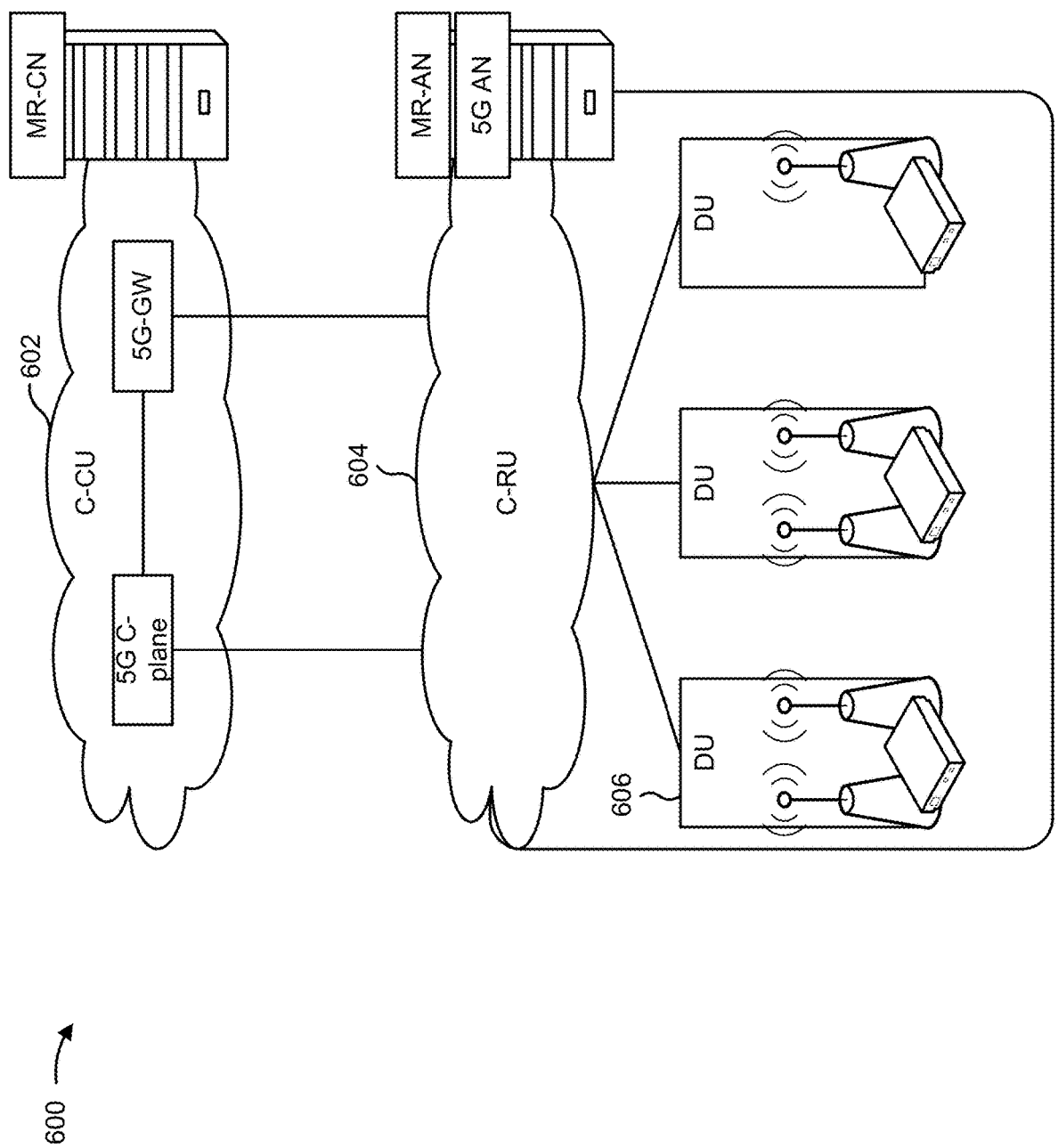
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples may differ from what is described with regard to FIG. 6.

In a wireless network, a UE may be communicatively connected to a plurality of TRPs, referred to a multi-TRP configuration, and may transmit communications to, and/or receive communications from, the plurality of TRPs. In some cases, a TRP, of the plurality of TRPs, may transmit a DCI communication to the UE. The DCI communication may include one or more fields that specify one or more (or multi-panel) parameters for the multi-TRP configuration, such as a transmission configuration indication (TCI) field that indicates one or more TCI states (which may indicate one or more QCL relationships associated with the plurality of TRPs), a DMRS port field (which may indicate one or more DMRS ports associated with the plurality of TRPs), and/or the like.

In some cases, a TRP may be unable to transmit, and/or a UE may be unable to receive, a DCI communication that specifies the one or more parameters for a multi-TRP configuration. For example, the UE may be unable to receive a DCI communication of a particular format that is capable of specifying the one or more parameters, such as a format 1_0 DCI communication (which may also be referred to as a fallback DCI communication), a format 1_1 DCI communication in which a TCI-PresentInDCI field and/or a DMRS port field is not configured, and/or the like. In some cases, a UE may be unable to receive a DCI communication that specifies the one or more parameters for the multi-TRP configuration if the DCI format is monitored in a common search space set (CSS) in which DCI format 1_1 cannot be configured. In some cases, a UE may be unable to receive a DCI communication that specifies the one or more parameters for the multi-TRP configuration if the UE is configured to receive a limited quantity of DCI communication types, and format 1_1 DCI communications is not a DCI communication type that the UE is configured to receive.

As a result of the TRP being unable to transmit, and/or the UE being unable to receive, a DCI communication that specifies one or more parameters for the multi-TRP configuration, the UE may be unable to locate PDCCH communications that are transmitted by the TRP (and other TRPs in the multi-TRP configuration), the UE may be unable to locate PDSCH communications that are transmitted by the TRP (and the other TRPs in the multi-TRP configuration), the UE may be unable to differentiate between communications that are transmitted by the TRP and communications that are transmitted by another TRP in the multi-TRP configuration, and/or the like.

Some aspects described herein provide techniques and apparatuses for QCL relationship and/or DMRS port identification. In some aspects, a UE may receive, from a TRP in a multi-TRP configuration, a DCI communication. The UE may identify one or more QCL relationships and/or one or more DMRS ports associated with a control resource set (CORESET) and/or a search space sets in which the DCI communication is received. The one or more QCL relationships may include a first QCL relationship associated with the TRP, a second QCL relationship associated with another TRP, and/or the like. The one or more DMRS ports may include a first DMRS port associated with the first QCL relationship, a second DMRS port associated with the second QCL relationship, and/or the like.

In this way, the UE is permitted to be configured with one or more parameters for the multi-TRP configuration even if the DCI communication does not include the one or more parameters and/or is not capable of specifying the one or more parameters. This permits the UE to identify the one or more QCL relationships and receive, based at least in part on the one or more QCL relationships, one or more PDSCH layers that are transmitted by the TRP and/or the other TRP. Moreover, this permits the UE to identify the one or more DMRS ports and perform, based at least in part on the one or more DMRS ports, a channel estimation of the one or more PDSCH layers that are transmitted by the TRP and/or the other TRP.

Figure 7A:
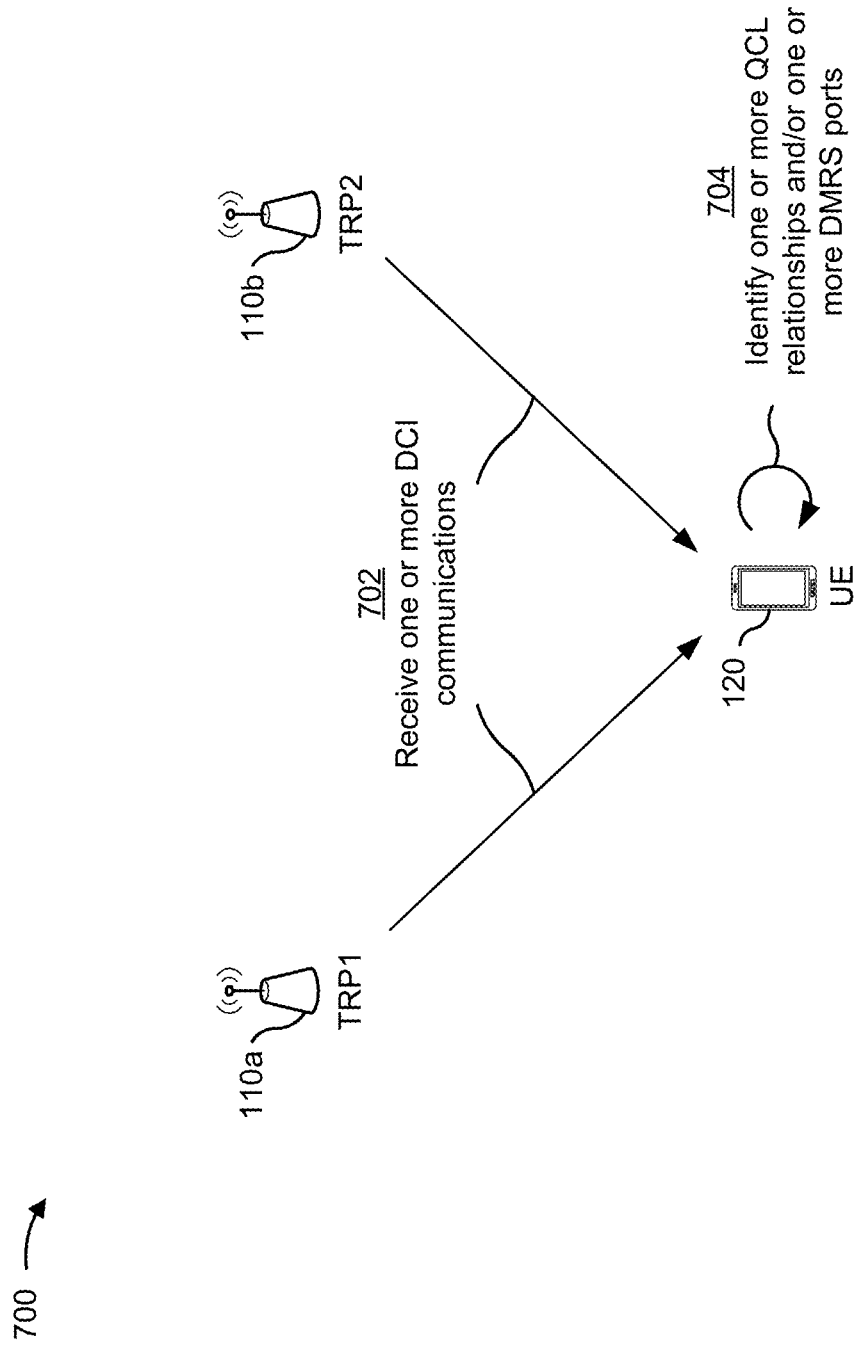
FIGS. 7A-7C are diagrams illustrating an example of QCL relationship and/or DMRS port identification, in accordance with various aspects of the present disclosure.
Figure 7B:
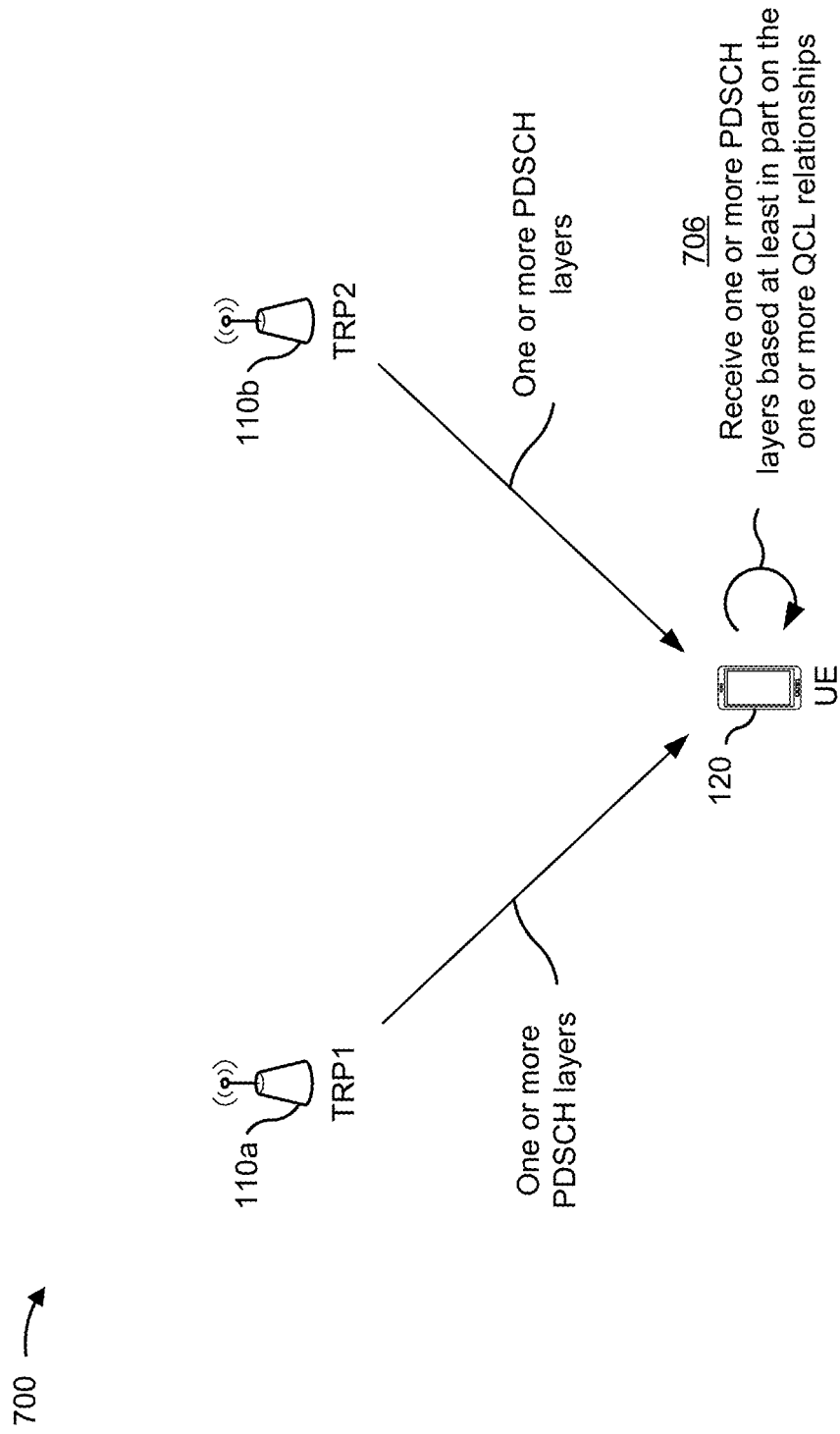
Figure 7C:
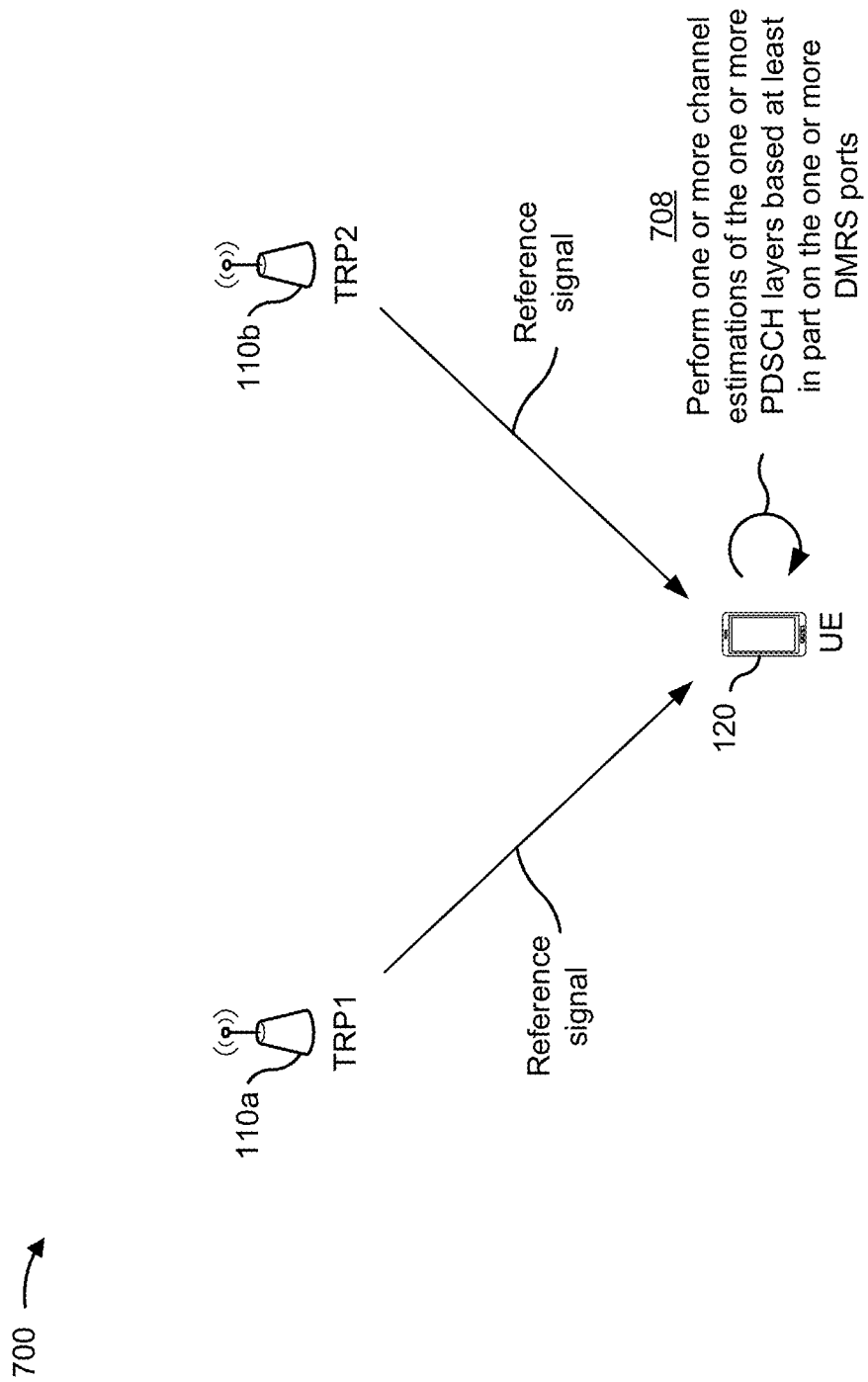

FIGS. 7A-7C are diagrams illustrating an example 700 of QCL relationship and/or DMRS port identification, in accordance with various aspects of the present disclosure. As shown in FIGS. 7A-7C, example 700 may include a plurality of TRPs (e.g., TRP1, TRP2, and/or the like) and a UE (e.g., UE 120). In some aspects, each TRP, of the plurality of TRPs illustrated in FIGS. 7A-7C, may correspond to a respective BS (e.g., BS 110*a*, BS 110*b*, BS 110*c*, BS 110*d*, and/or the like). In some aspects, two or more TRPs, of the plurality of TRPs, may be correspond to the same BS. For example, a first TRP may correspond to a first antenna panel or antenna array of a BS and a second TRP may correspond to a second antenna panel or antenna array of the BS.

In some aspects, the plurality of TRPs, and UE 120, may be included in a wireless network (e.g., wireless network 100 and/or the like). UE 120 may be communicatively connected with the plurality of TRPs in a multi-TRP configuration. UE 120 may receive one or more PDSCH layers from the plurality of TRPs in the multi-TRP configuration. For example, UE 120 may receive one or more PDSCH layers from TRP1, may receive one or more PDSCH layers from TRP2 (e.g., the same one or more PDSCH layers as received from TRP1, a different one or more PDSCH layers than the one or more PDSCH layers received from TRP1, and/or the like).

As shown in FIG. 7A, and by reference number 702, UE 120 may receive one or more DCI communications. In some aspects, UE 120 may identify one or more parameters, for the multi-TRP configuration, based at least in part on receiving the one or more DCI communications. In some aspects, the one or more DCI communications may include a format 1_0 DCI communication and/or a format 1_1 DCI communication in which a TCI-PresentInDCI field and/or a DMRS port field is not configured.

In some aspects, a TRP, of the plurality of TRPs, may transmit a DCI communication to UE 120. UE 120 may receive the DCI communication via a PDCCH transmitted from the TRP. In some aspects, UE 120 may receive the DCI communication in a particular CORESET and/or a particular search space set. UE 120 may receive the DCI communication by monitoring a plurality of CORESETS and/or search space sets, and identifying the DCI communication in the particular CORESET and/or the particular search space set.

The CORESET may comprise a resource configuration for a control portion of a downlink between the TRP and UE 120. The resource configuration may include information identifying a bandwidth of the control portion and a time duration of the control portion. The information identifying the bandwidth may include information identifying one or more frequency carriers, one or more subcarriers, and/or the like, associated with the control portion. The information identifying the time duration may include information identifying a quantity of symbols, a quantity of slots, a quantity of subframes, and/or the like, associated with the control portion. In some aspects, the search space set may correspond to one or more candidate locations, in the time or frequency domain of the resource configuration for the control portion, at which the DCI communication may be located. The one or more candidate locations may be specified in one or more symbols, one or more slots, one or more subframes, one or more control channel elements, and/or the like.

As further shown in FIG. 7A, and by reference number 704, UE 120 may identify the one or more parameters for the multi-TRP configuration, which may identify one or more QCL relationships, one or more DMRS ports, and/or the like. In some aspects, UE 120 may identify the one or more parameters for the multi-TRP configuration based at least in part on the CORESET and/or the search space set in which the DCI communication was received, based at least in part on information included in the DCI communication, and/or the like.

In some aspects, a QCL relationship may indicate one or more channel properties (e.g., Doppler spread, Doppler shift, timing offset-related average delay, delay spread, average gain, and/or the like) for a physical downlink channel (e.g., a PDCCH, one or more PDSCH layers, and/or the like). UE 120 may identify and receive a physical downlink channel based at least in part on the one or more channel properties associated with the physical downlink channel.

In some aspects a DMRS port (which may also be referred to as an antenna port) may indicate a resource configuration for one or more downlink slots in which a DMRS is transmitted. In this way, the UE 120 may use the resource configuration to identify one or more resource elements that carry the DMRS so that UE 120 may detect the DMRS and perform a channel estimation for a corresponding one or more PDSCH layers.

In some aspects, UE 120 may identify the one or more QCL relationships and/or DMRS ports based at least in part on determining that the DCI communication is for multi-TRP. In some aspects, UE 120 may determine that the DCI communication is for multi-TRP based at least in part on the CORESET and/or the search space set in which the DCI communication is received. For example, the CORESET and/or the search space set may be designated as a multi-TRP CORESET and/or a multi-TRP search space set. Accordingly, any DCI communications that are received in the CORESET and/or the search space set may be identified as being for multi-TRP. In some implementations, a CORESET may be associated with a plurality of search space sets, where a subset of the plurality of search space sets is for multi-TRP and another subset of the plurality of search space sets is for single-TRP. In this way, the CORESET may be flexibly used for multi-TRP and single-TRP.

In some aspects, UE 120 may determine that the DCI communication is for multi-TRP based at least in part on an indication in the DCI communication. In some aspects, the indication may include a value, a flag, and/or another type of information included in a field in the DCI communication, such as a multi-TRP field and/or the like. UE 120 may determine that the DCI communication is for multi-TRP based at least in part on the value, the flag, and/or the like, specified in the field indicating whether the DCI communication is for multi-TRP.

In some aspects, depending on the multi-TRP scheduling mode that is used in the multi-TRP configuration, UE 120 may identify respective QCL relationships and respective DMRS ports for the TRPs in the multi-TRP configuration. In some aspects, when multi-TRP Mode 1 (single-DCI based multi-TRP) is used in the multi-TRP configuration, a TRP (e.g., TRP1) may provide multi-TRP scheduling for a plurality of TRPs via the DCI communication. In this case, UE 120 may identify, based at least in part on the COREST and/or the search space set in which the DCI communication is received (e.g., from TRP1), a plurality of QCL relationships and/or a plurality of DMRS ports associated with a plurality of TRPs.

For example, where TRP1 provides multi-TRP scheduling for TRP1 and TRP2 via the DCI communication, UE 120 may identify, based at least in part on the CORESET and/or the search space set in which the DCI communication is received, a first QCL relationship that is associated with TRP1 (which may be the same QCL relationship that is associated with the PDCCH via which the DCI communication is received or a different QCL relationship) and a second QCL relationship that is associated with TRP2. UE 120 may receive one or more PDSCH layers, that are transmitted from TRP1, based at least in part on the one or more channel properties indicated by the first QCL relationship, and may receive one or more PDSCH layers (e.g., one or more PDSCH layers of the same PDSCH as the one or more PDSCH layers transmitted from TRP1, one or more PDSCH layers of a different PDSCH than the one or more PDSCH layers transmitted from TRP1, and/or the like), that are transmitted from TRP2, based at least in part on the one or more channel properties indicated by the second QCL relationship.

In addition, UE 120 may identify, based at least in part on the CORESET and/or the search space set in which the DCI communication is received, a first DMRS port that is associated with the first QCL relationship and a second DMRS port that is associated with the second QCL relationship. UE 120 may identify, based at least in part on the first DMRS port associated with the first QCL relationship, a DMRS associated with the one or more PDSCH layers that are transmitted from TRP1, and may perform a channel estimation of the one or more PDSCH layers based at least in part on the DMRS. Similarly, UE 120 may identify, based at least in part on the second DMRS port associated with the second QCL relationship, a DMRS associated with the one or more PDSCH layers that are transmitted from TRP2, and may perform a channel estimation of the one or more PDSCH layers based at least in part on the DMRS.

In some aspects, UE 120 may identify DMRS ports based at least in part on a default DMRS ports associated with the CORSET and/or the search space set. For example, UE 120 may identify a DMRS port for the DCI communication as the default DMRS port for the CORSET and/or the search space set based at least in part on the DCI communication being received in the CORSET and/or the search space set. Similarly, if UE 120 is deployed in a mode 2 multi-TRP deployment (multi-DCI based multi-TRP, e.g., where each TRP transmits a respective DCI communication), UE 120 may identify a DMRS port for a DCI communication from TRP1 as the default DMRS port for the CORSET and/or the search space set based at least in part on the DCI communication being received in the CORSET and/or the search space set, and may identify another DMRS port for another DCI communication received from TRP2 as the default DMRS port for another CORSET and/or another search space set based at least in part on the other DCI communication being received in the other CORSET and/or the other search space set.

In some aspects, UE 120 may identify DMRS ports based at least in part on explicit indications of the default DMRS ports. For example, UE 120 may receive a DCI communication that explicitly indicates the default DMRS port (e.g., DMRS port 1001) and the second DMRS port (e.g., DMRS port 1002).

In some aspects, where TRP1 provides multi-TRP Mode 1 scheduling for a plurality of other TRPs via the DCI communication (e.g., TRP2 and another TRP), UE 120 may identify, based at least in part on the CORESET and/or the search space set in which the DCI communication is received, a first QCL relationship that is associated with TRP2 and a second QCL relationship that is associated with the other TRP. Accordingly, UE 120 may receive one or more PDSCH layers, that are transmitted from TRP2, based at least in part on the one or more channel properties indicated by the first QCL relationship, and may receive one or more PDSCH layers (e.g., one or more PDSCH layers of the same PDSCH as the one or more PDSCH layers transmitted from TRP2, one or more PDSCH layers of a different PDSCH than the one or more PDSCH layers transmitted from TRP2, and/or the like), that are transmitted from the other TRP, based at least in part on the one or more channel properties indicated by the second QCL relationship.

In addition, UE 120 may identify, based at least in part on the CORESET and/or the search space set in which the DCI communication is received, a first DMRS port that is associated with the first QCL relationship and a second DMRS port that is associated with the second QCL relationship. UE 120 may identify, based at least in part on the first DMRS port associated with the first QCL relationship, a DMRS associated with the one or more PDSCH layers that are transmitted from TRP2, and may perform a channel estimation of the one or more PDSCH layers based at least in part on the DMRS. Similarly, UE 120 may identify, based at least in part on the second DMRS port associated with the second QCL relationship, a DMRS associated with the one or more PDSCH layers that are transmitted from the other TRP, and may perform a channel estimation of the one or more PDSCH layers based at least in part on the DMRS.

In some aspects, respective DCI communications, of a plurality of DCI communications, may provide scheduling for respective TRPs in the multi-TRP configuration (e.g., which may correspond to multi-TRP Mode 2). In some aspects, the plurality of DCI communications may cross-schedule TRPs in the multi-TRP configuration (e.g., a first DCI communication, transmitted from TRP1, may provide multi-TRP scheduling for TRP2, and a second DCI communication, transmitted from TRP2, may provide multi-TRP scheduling for TRP1). In this case, UE 120 may identify, based at least in part on a CORESET and/or a search space set in which the first DCI communication is received from TRP1, a first QCL relationship that is associated with TRP2, and may identify, based at least in part on a CORESET and/or a search space set in which the second DCI communication is received from TRP2, a second QCL relationship that is associated with another TRP (e.g., TRP1). Accordingly, UE 120 may receive one or more PDSCH layers, that are transmitted from TRP1, based at least in part on the one or more channel properties indicated by the second QCL relationship, and may receive one or more PDSCH layers (e.g., one or more PDSCH layers of the same PDSCH as the one or more PDSCH layers transmitted from TRP1, one or more PDSCH layers of a different PDSCH than the one or more PDSCH layers transmitted from TRP1, and/or the like), that are transmitted from TRP2, based at least in part on the one or more channel properties indicated by the first QCL relationship.

In addition, UE 120 may identify respective DMRS ports that are associated with the first QCL relationship and the second QCL relationship. For example, UE 120 may identify, based at least in part on the CORESET and/or the search space set in which the first DCI communication is received from TRP1, a first DMRS port that is associated with the first QCL relationship. UE 120 may identify, based at least in part on the CORESET and/or the search space set in which the second DCI communication is received from TRP2, a second DMRS port that is associated with the second QCL relationship. UE 120 may identify, based at least in part on the first DMRS port associated with the first QCL relationship, a DMRS associated with the one or more PDSCH layers that are transmitted from TRP2, and may perform a channel estimation of the one or more PDSCH layers based at least in part on the DMRS. Similarly, UE 120 may identify, based at least in part on the second DMRS port associated with the second QCL relationship, a DMRS associated with the one or more PDSCH layers that are transmitted from TRP1, and may perform a channel estimation of the one or more PDSCH layers based at least in part on the DMRS.

In some aspects, the one or more QCL relationships and/or the one or more DMRS ports that are associated with a CORESET and/or a search space set may be properties of the CORESET and/or the search space set. In some aspects, the one or more QCL relationships and/or the one or more DMRS ports that are associated with a CORESET and/or a search space set may be fixed or static for the CORESET and/or the search space set. In some aspects, the one or more QCL relationships and/or the one or more DMRS ports that are associated with a CORESET and/or a search space set may be configurable for the CORESET.

In some aspects, the one or more DMRS ports that are associated with a CORESET and/or search space set may include a DMRS port that is fixed and/or static for the CORESET and/or the search space set, and may include a DMRS port that is configurable for the CORESET and/or the search space set. In some aspects, the one or more QCL relationships that are associated with a CORESET and/or search space set may be associated with respective DMRS ports such that the respective DMRS ports are associated with different code division multiplexing (CDM) groups.

In some aspects, UE 120 may identify the one or more QCL relationships and/or the one or more DMRS ports that are associated with a CORESET and/or a search space set by performing a lookup (e.g., in a look-up table, in a database, and/or in another type of data structure) to identify the one or more QCL relationships and/or one or more DMRS ports. In some aspects, UE 120 may be pre-configured with the association between the CORESET and/or the search space set and the one or more QCL relationships and/or the one or more DMRS ports.

As shown in FIG. 7B, and by reference number 706, UE 120 may receive one or more PDSCH layers based at least in part on the one or more QCL relationships that are associated with respective CORESETS and/or search space sets in which the one or more DCI communications were received. For example, UE 120 may receive one or more PDSCH layers from TRP1 based at least in part on a QCL relationship associated with the one or more PDSCH layers, may receive one or more PDSCH layers from TRP2 based at least in part on a QCL relationship associated with the one or more PDSCH layers, and/or the like. To receive one or more PDSCH layers from a particular TRP, UE 120 may decode and/or interpret the one or more PDSCH layers based at least in part on the one or more channel properties associated with the QCL relationship that is associated with the one or more PDSCH layers.

In some aspects, UE 120 may determine which QCL relationship is associated with one or more PDSCH layers that are transmitted from a particular TRP. In some aspects, the one or more QCL relationships associated with a CORESET and/or a search space set may be configured such that a first QCL relationship, of the one or more QCL relationships, is associated with a TRP that transmitted the DCI communication. In this case, if TRP1 transmitted the DCI communication, UE 120 may determine that the first QCL relationship is associated with TRP1, and may receive the one or more PDSCH layers, transmitted from TRP1, based at least in part on the first QCL relationship. Accordingly, UE 120 may infer that a second QCL relationship, of the one or more QCL relationships, is associated with TRP2, and may accordingly receive the one or more PDSCH layers, transmitted from TRP2, based at least in part on the second QCL relationship.

In some aspects, UE 120 may determine which QCL relationship is associated with one or more PDSCH layers that are transmitted from a particular TRP based at least in part on an explicit indication in the one or more DCI communications. For example, a DCI communication may be configured with an explicit indication (e.g., a value, a flag, and/or another type of indication), in a TRP field, that indicates the TRP to which a QCL relationship, associated with the CORESET and/or search space set on which the DCI communication is received, is associated. In this case, if TRP1 transmits the DCI communication, and the DCI communication indicates TRP2 in the TRP field, UE 120 may determine that the QCL relationship, associated with the CORESET and/or search space set, is associated with TRP2. Accordingly, UE 120 may receive one or more PDSCH layers, transmitted from TRP2, based at least in part on the QCL relationship.

In some aspects, UE 120 may determine which QCL relationship is associated with one or more PDSCH layers that are transmitted from a particular TRP based at least in part on determining an implicit indication in the one or more DCI communications. In some aspects, the implicit indication may include any field, in the one or more DCI communications, that specifies information that may implicitly identify the particular TRP. For example, UE 120 may determine that a hybrid automatic repeat request (HARQ) process identifier, specified in a HARQ process identifier field included in a DCI communication, is associated with the particular TRP, and accordingly may determine that the QCL relationship, associated with the CORESET and/or search space set on which the DCI communication is received, is associated with the particular TRP.

As shown in FIG. 7C, and by reference number 708, UE 120 may perform one or more respective channel estimations, for one or more PDSCH layers, based at least in part on the one or more DMRS ports that are associated with respective CORESETS and/or search space sets in which the one or more DCI communications were received. For example, UE 120 may identify, based at least in part on a resource configuration specified by a DMRS port of the one or more DMRS ports, a reference signal (e.g., a DMRS, a phase tracking reference signal (PTRS), and/or the like) that is transmitted by a particular TRP associated with the DMRS port, may decode the one or more reference signals, and may perform one or more measurements, for a PDSCH layer associated with the DMRS port, based at least in part on the decoded reference signal (e.g., a signal quality measurement, a signal strength measurement, and/or the like).

In some aspects, UE 120 may perform a channel estimation for each respective DMRS port that is associated with the one or more QCL relationships that are associated with respective CORESETS and/or search space sets in which the one or more DCI communications were received. For example, UE 120 may identify a first QCL relationship of the one or more QCL relationships, may identify a DMRS port associated with the first QCL relationship, may identify a first reference signal (e.g., based at least in part on the DMRS port) associated with a first PDSCH layer, of one or more PDSCH layers that are associated with the first QCL relationship, and may perform a channel estimation of the first PDSCH layer. UE 120 may repeat the above steps for each DMRS port that is associated with a QCL relationship of the one or more QCL relationships that are associated with respective CORESETS and/or search space sets in which the one or more DCI communications were received.

In some aspects, UE 120 may determine which DMRS port is associated with a particular TRP. In some aspects, the one or more DMRS ports associated with a CORESET and/or a search space set may be configured such that a first DMRS port, of the one or more DMRS ports, is associated with a TRP that transmitted the DCI communication. In this case, if TRP1 transmitted the DCI communication, UE 120 may determine that the first DMRS port is associated with TRP1. Accordingly, UE 120 may infer that a second DMRS port, of the one or more DMRS ports, is associated with TRP2.

In some aspects, UE 120 may determine which DMRS port is associated with a particular TRP based at least in part on an explicit indication in the one or more DCI communications. For example, a DCI communication may be configured with an explicit indication (e.g., a value, a flag, and/or another type of indication), in a TRP field, that indicates the TRP to which a DMRS port, associated with the CORESET and/or search space set on which the DCI communication is received, is associated. In this case, if TRP1 transmits the DCI communication, and the DCI communication indicates TRP2 in the TRP field, UE 120 may determine that the DMRS port, associated with the CORESET and/or search space set, is associated with TRP2.

In some aspects, UE 120 may determine which DMRS port is associated with a particular TRP based at least in part on determining an implicit indication in the one or more DCI communications. In some aspects, the implicit indication may include any field, in the one or more DCI communications, that specifies information that may implicitly identify the particular TRP. For example, UE 120 may determine that a hybrid automatic repeat request (HARQ) process identifier, specified in a HARQ process identifier field included in a DCI communication, is associated with the particular TRP, and accordingly may determine that the DMRS ports, associated with the CORESET and/or search space set on which the DCI communication is received, is associated with the particular TRP.

In this way, UE 120 is permitted to be configured with one or more parameters for the multi-TRP configuration even if the one or more DCI communications received from TRP1 and/or TRP2 do not include the one or more parameters and/or are not capable of specifying the one or more parameters. This permits UE 120 to identify one or more QCL relationships and receive, based at least in part on the one or more QCL relationships, one or more PDSCH layers that are transmitted by TRP1, TRP2, and/or other TRPs. Moreover, this permits UE 120 to identify one or more DMRS ports and perform, based at least in part on the one or more DMRS ports, a channel estimation of the one or more PDSCH layers that are transmitted by TRP1, TRP2, and/or other TRPs.

As indicated above, FIGS. 7A-7C are provided as an example. Other examples may differ from what is described with respect to FIGS. 7A-7C.

For example, while FIGS. 7A-7C are described above in the context of multi-TRP, the examples illustrated in FIGS. 7A-7C may similarly be applied to multi-panel, which may refer to different PDSCH layers being transmitted from respective antenna panels. In this case, UE 120 may determine that a DCI communication, that is received in a CORESET and/or a search space set, is for multi-panel, and accordingly may identify one or more QCL relationships and/or one or more DMRS ports, that are associated with respective antenna panels, based at least in part on the CORESET and/or the search space set.

Figure 8:
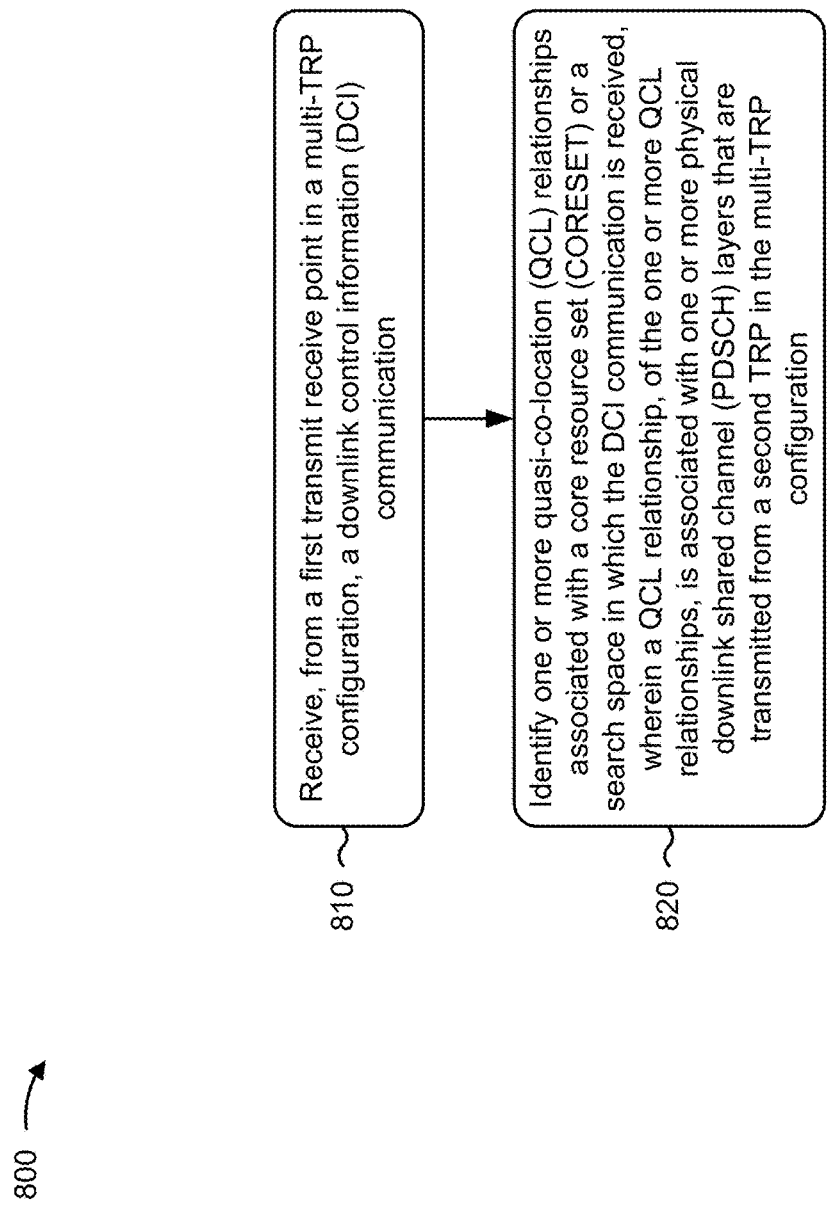
FIG. 8 is a diagram illustrating an example process performed, for example, by a UE, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120) performs QCL relationship and/or DMRS port identification.

As shown in FIG. 8, in some aspects, process 800 may include receiving, from a first transmit receive point in a multi-TRP configuration, a DCI communication (block 810). For example, the UE (e.g., using receive processor 258, controller/processor, 280, memory 282, and/or the like) may receive, from a first transmit receive point in a multi-TRP configuration, a DCI communication, as described above.

As further shown in FIG. 8, in some aspects, process 800 may include identifying one or more QCL relationships associated with a CORESET or a search space set in which the DCI communication is received, wherein a QCL relationship, of the one or more QCL relationships, is associated with one or more PDSCH layers that are transmitted from a second TRP in the multi-TRP configuration (block 820). For example, the UE (e.g., using controller/processor, 280, memory 282, and/or the like) may identifying one or more QCL relationships associated with a CORESET or a search space set in which the DCI communication is received, as described above. In some aspects, a QCL relationship, of the one or more QCL relationships, is associated with one or more physical downlink shared channel (PDSCH) layers that are transmitted from a second TRP in the multi-TRP configuration.

Process 800 may include additional aspects, such as any single aspect or any combination of aspects described below and/or in connection with one or more other processes described elsewhere herein.

In a first aspect, the DCI communication comprises one of a format 1_0 DCI communication or a format 1_1 DCI communication in which a TCI-PresentInDCI field is not configured. In a second aspect, alone or in combination with the first aspect, another QCL relationship, of the one or more QCL relationships, is associated with one or more PDSCH layers that are transmitted from the first TRP. In a third aspect, alone or in combination with one or more of the first or second aspects, the other QCL relationship is used for a PDCCH on which the DCI communication is received. In a fourth aspect, alone or in combination with one or more of the first through third aspects, process 800 includes determining that the DCI communication is for at least one of multi-TRP or multi-panel, and identifying the one or more QCL relationships based at least in part on determining that the DCI communication is for at least one of multi-TRP or multi-panel.

In a fifth aspect, alone or in combination with one or more of the first through fourth aspects, determining that the DCI communication is for at least one of multi-TRP or multi-panel comprises determining, based at least in part on the CORESET in which the DCI communication is received, that the DCI communication is for at least one of multi-TRP or multi-panel. In a sixth aspect, alone or in combination with one or more of the first through fifth aspects, determining that the DCI communication is for at least one of multi-TRP or multi-panel comprises determining, based at least in part on the search space set in which the DCI communication is received, that the DCI communication is for at least one of multi-TRP or multi-panel.

In a seventh aspect, alone or in combination with one or more of the first through sixth aspects, determining that the DCI communication is for at least one of multi-TRP or multi-panel comprises determining, based at least in part on information included in the DCI communication, that the DCI communication is for at least one of multi-TRP or multi-panel. In an eighth aspect, alone or in combination with one or more of the first through seventh aspects, another QCL relationship, of the one or more QCL relationships, is associated with one or more PDSCH layers that are transmitted from a third TRP.

In a ninth aspect, alone or in combination with one or more of the first through eighth aspects, the QCL relationship is a first QCL relationship, a second QCL relationship, of the one or more QCL relationships, is associated with one or more PDSCH layers that are transmitted from the first TRP, and a third QCL relationship, of the one or more QCL relationships, is associated with a PDCCH that is transmitted from the first TRP.

In a tenth aspect, alone or in combination with one or more of the first through ninth aspects, the DCI communication includes an indication that the QCL relationship is associated with the second TRP. In an eleventh aspect, alone or in combination with one or more of the first through tenth aspects, the indication that the QCL relationship is associated with the second TRP comprises an explicit indication in a TRP field included in the DCI communication. In a twelfth aspect, alone or in combination with one or more of the first through eleventh aspects, the indication that the QCL relationship is associated with the second TRP comprises an implicit indication included in the DCI communication. In a thirteenth aspect, alone or in combination with one or more of the first through twelfth aspects, the implicit indication comprises an indication of a HARQ process identifier included in a HARQ process identifier field included in the DCI communication.

In a fourteenth aspect, alone or in combination with one or more of the first through thirteenth aspects, another QCL relationship, of the one or more QCL relationships, is associated with one or more PDSCH layers that are transmitted from the first TRP, and process 800 includes identifying a first DMRS port associated with the QCL relationship and a second DMRS port associated with the other QCL relationship, performing, based at least in part on the first DMRS port, a channel estimation of a layer that is transmitted from the second TRP, and performing, based at least in part on the second DMRS port, a channel estimation of a layer that is transmitted from the first TRP.

In a fifteenth aspect, alone or in combination with one or more of the first through fourteenth aspects, the first DMRS port and the second DMRS port are associated with different CDM groups. In a sixteenth aspect, alone or in combination with one or more of the first through fifteenth aspects, at least one of the first DMRS port or the second DMRS port is configurable. In a seventeenth aspect, alone or in combination with one or more of the first through sixteenth aspects, the first DMRS port and the second DMRS port are associated with the CORESET or the search space set. In an eighteenth aspect, alone or in combination with one or more of the first through seventeenth aspects, process 800 includes identifying a DMRS port associated with the QCL relationship and performing, based at least in part on the DMRS port, a channel estimation of a layer that is transmitted from the second TRP.

In a nineteenth aspect, alone or in combination with one or more of the first through eighteenth aspects, identifying the DMRS port associated with the QCL relationship comprises identifying, based at least in part on the CORESET or the search space set, the DMRS port associated with the QCL relationship. In a twentieth aspect, alone or in combination with one or more of the first through nineteenth aspects, identifying the DMRS port associated with the QCL relationship comprises identifying, based at least in part on determining that the DCI communication is for at least one of multi-TRP or multi-panel, the DMRS port associated with the QCL relationship.

In a twenty-first aspect, alone or in combination with one or more of the first through twentieth aspects, determining that the DCI communication is for at least one of multi-TRP or multi-panel comprises determining, based at least in part on information included in the DCI communication, that the DCI communication is for at least one of multi-TRP or multi-panel. In a twenty-second aspect, alone or in combination with one or more of the first through twenty-first aspects, identifying the DMRS port associated with the QCL relationship comprises identifying the DMRS port, from a plurality of DMRS ports, based at least in part on determining that the DMRS port is associated with the second TRP.

In a twenty-third aspect, alone or in combination with one or more of the first through twenty-second aspects, determining that the DMRS port is associated with the second TRP comprises determining that the DMRS port is associated with the second TRP based at least in part on an indication, included in the DCI communication, that the DMRS port is associated with the second TRP. In a twenty-fourth aspect, alone or in combination with one or more of the first through twenty-third aspects, the indication that the DMRS port is associated with the second TRP comprises an explicit indication in a TRP field included in the DCI communication.

In a twenty-fifth aspect, alone or in combination with one or more of the first through twenty-fourth aspects, the indication that the DMRS port is associated with the second TRP comprises an implicit indication included in the DCI communication. In a twenty-sixth aspect, alone or in combination with one or more of the first through twenty-fifth aspects, the implicit indication comprises an indication of a HARQ process identifier included in a HARQ process identifier field included in the DCI communication.

In a twenty-seventh aspect, alone or in combination with one or more of the first through twenty-sixth aspects, the DCI communication is a format 1_0 DCI communication and process 800 further comprises identifying, based at least in part on receiving the DCI communication in the CORESET or the search space set, a DMRS port for a scheduled PDSCH associated with the CORESET or the search space set, wherein the DMRS port is a default DMRS port configured for the scheduled PDSCH associated with the CORSET or the search space set.

In a twenty-eighth aspect, alone or in combination with one or more of the first through twenty-seventh aspects, process 800 further comprises receiving another DCI communication from the second TRP in another CORESET or another search space set and identifying, based at least in part on receiving the other DCI communication in the other DMRS or the other search space set, a second DMRS port for the scheduled PDSCH associated with the CORESET or the search space set, wherein the other DMRS port is a default DMRS port for the scheduled PDSCH configured for the other CORSET or the other search space set.

In a twenty-ninth aspect, alone or in combination with one or more of the first through twenty-eighth aspects, the DCI communication is a first DCI communication, and process 800 further comprises receiving a second DCI communication from the second TRP in another CORESET or another search space set; receiving a third DCI communication; identifying, in the third DCI communication, an explicit indication that a first DMRS port for a PDSCH scheduled by the first DCI communication is a first default DMRS port; and identifying, in the third DCI communication, an explicit indication that a second DMRS port for another PDSCH scheduled by the second DCI communication is a second default DMRS port.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a first transmit receive point (TRP) of a plurality of TRPs, in communication with the UE, in a multi-TRP configuration, a downlink control information (DCI) communication in a particular control resource set (CORESET) or a particular search space set; and
   identifying, based at least in part on the particular CORESET or the particular search space set in which the DCI communication is received, a demodulation reference signal (DMRS) port for a scheduled physical downlink shared channel (PDSCH) associated with the particular CORESET or the particular search space set,
      wherein the DMRS port is associated with one or more quasi co-location (QCL) relationships including a QCL relationship associated with one or more physical downlink shared channel (PDSCH) layers that are transmitted from a second TRP of the plurality of TRPs.

2. The method of claim 1, wherein the DCI communication is a format 1_0 DCI communication,
   wherein the DMRS port is a default DMRS port to use for the scheduled PDSCH, and
   wherein the DMRS port is configured for the particular CORSET or the particular search space set.

3. The method of claim 2, further comprising:
   receiving another DCI communication from the second TRP in another CORESET or another search space set; and
   identifying, based at least in part on receiving the other DCI communication in the other CORESET or the other search space set, a second DMRS port for the scheduled PDSCH, wherein the other DMRS port is a default DMRS port to use for the scheduled PDSCH configured for the other CORSET or the other search space set.

4. The method of claim 1, further comprising:
receiving a second DCI communication from the second TRP in another CORESET or another search space set;
receiving a third DCI communication;
identifying, in the third DCI communication, an explicit indication that the DMRS port is a first default DMRS port; and
identifying, in the third DCI communication, an explicit indication that a second DMRS port for a second PDSCH scheduled by the second DCI communication is a second default DMRS port.

5. The method of claim 1, wherein another QCL relationship, of the one or more QCL relationships, is associated with one or more other PDSCH layers that are transmitted from the first TRP; and
wherein the other QCL relationship is used for a physical downlink control channel (PDCCH) on which the DCI communication is received.

6. The method of claim 1, further comprising:
determining that the DCI communication is for at least one of:
the plurality of TRPs, or
a plurality of panels; and
identifying the one or more QCL relationships based at least in part on determining that the DCI communication is for at least one of the plurality of TRPs or the plurality of panels.

7. The method of claim 6, wherein determining that the DCI communication is for at least one of the plurality of TRPs or the plurality of panels comprises:
determining, based at least in part on the particular CORESET in which the DCI communication is received, that the DCI communication is for at least one of the plurality of TRPs or the plurality of panels.

8. The method of claim 6, wherein determining that the DCI communication is for at least one of the plurality of TRPs or the plurality of panels comprises:
determining, based at least in part on the particular search space set in which the DCI communication is received, that the DCI communication is for at least one of the plurality of TRPs or the plurality of panels based at least in part on information included in the DCI communication.

9. The method of claim 1, wherein another QCL relationship, of the one or more QCL relationships, is associated with one or more PDSCH layers that are transmitted from a third TRP of the plurality of TRPs.

10. The method of claim 1, wherein the QCL relationship is a first QCL relationship;
wherein a second QCL relationship, of the one or more QCL relationships, is associated with one or more PDSCH layers that are transmitted from the first TRP; and
wherein a third QCL relationship, of the one or more QCL relationships, is associated with a physical downlink control channel (PDCCH) that is transmitted from the first TRP.

11. The method of claim 1, wherein the DCI communication includes an indication that the QCL relationship is associated with the second TRP.

12. The method of claim 11, wherein the indication that the QCL relationship is associated with the second TRP comprises:
an explicit indication in a TRP field included in the DCI communication.

13. The method of claim 11, wherein the indication that the QCL relationship is associated with the second TRP comprises:
an implicit indication included in the DCI communication comprising:
an indication of a hybrid automatic repeat request (HARQ) process identifier included in a HARQ process identifier field included in the DCI communication.

14. The method of claim 1, wherein another QCL relationship, of the one or more QCL relationships, is associated with one or more PDSCH layers that are transmitted from the first TRP; and
wherein the method further comprises:
identifying a second DMRS port associated with the other QCL relationship;
performing, based at least in part on the DMRS port, a channel estimation of a layer that is transmitted from the second TRP; and
performing, based at least in part on the second DMRS port, a channel estimation of a layer that is transmitted from the first TRP.

15. The method of claim 14, wherein the first DMRS port and the second DMRS port are associated with different code division multiplexing (CDM) groups.

16. The method of claim 14, wherein at least one of the first DMRS port or the second DMRS port is configurable.

17. The method of claim 14, wherein the first DMRS port and the second DMRS port are associated with the particular CORESET or the particular search space set.

18. The method of claim 1, further comprising:
identifying a demodulation reference signal (DMRS) port associated with the QCL relationship; and
performing, based at least in part on the DMRS port, a channel estimation of a layer that is transmitted from the second TRP.

19. The method of claim 18, wherein identifying the DMRS port associated with the QCL relationship comprises:
determining, based at least in part on information included in the DCI communication, that the DCI communication is for at least one of the plurality of TRPs or a plurality of panels; and
identifying, based at least in part on determining that the DCI communication is for at least one of the plurality of TRPs or the plurality of panels, the DMRS port associated with the QCL relationship.

20. The method of claim 18, wherein identifying the DMRS port associated with the QCL relationship comprises:
determining that the DMRS port is associated with the second TRP based at least in part on an indication, included in the DCI communication, that the DMRS port is associated with the second TRP; and
identifying the DMRS port, from a plurality of DMRS ports, based at least in part on determining that the DMRS port is associated with the second TRP.

21. The method of claim 20, wherein the indication that the DMRS port is associated with the second TRP comprises:
an explicit indication in a TRP field included in the DCI communication.

22. The method of claim 20, wherein the indication that the DMRS port is associated with the second TRP comprises:
an implicit indication included in the DCI communication, wherein the implicit indication comprises:
an indication of a hybrid automatic repeat request (HARQ) process identifier included in a HARQ process identifier field included in the DCI communication.

23. A user equipment (UE) for wireless communication, comprising:
a memory; and
one or more processors coupled to the memory, the one or more processors configured to:
receive, from a first transmit receive point (TRP) of a plurality of TRPs, in communication with the UE, in a multi-TRP configuration, a downlink control information (DCI) communication in a particular control resource set (CORESET) or a particular search space set; and
identify, based at least in part on the particular CORESET or the particular search space set in which the DCI communication is received, a demodulation reference signal (DMRS) port for a scheduled physical downlink shared channel (PDSCH) associated with the particular CORESET or the particular search space set,
wherein the DMRS port is associated with one or more quasi co-location (QCL) relationships including a QCL relationship associated with one or more physical downlink shared channel (PDSCH) layers that are transmitted from a second TRP of the plurality of TRPs.

24. The UE of claim 23, wherein the DCI communication is a format 1_0 DCI communication, and wherein the DMRS port is a default DMRS port configured for the scheduled PDSCH.

25. The UE of claim 24, wherein the one or more processors are further configured to:
receive another DCI communication from the second TRP in another CORESET or another search space set; and
identify, based at least in part on receiving the other DCI communication in the other DMRS or the other search space set, a second DMRS port for the scheduled PDSCH,
wherein the other DMRS port is a default DMRS port for another scheduled PDSCH configured for the other CORSET or the other search space set.

26. The UE of claim 23, wherein the one or more processors are further to:
receive a second DCI communication from the second TRP in another CORESET or another search space set;
receive a third DCI communication;
identify, in the third DCI communication, an explicit indication that the DMRS is a first default DMRS port; and
identify, in the third DCI communication, an explicit indication that a second DMRS port for a second scheduled PDSCH associated with the second DCI communication is a second default DMRS port.

27. A non-transitory computer-readable medium storing one or more instructions for wireless communication, the one or more instructions comprising:
one or more instructions that, when executed by one or more processors of a user equipment (UE), cause the one or more processors to:
receive, from a first transmit receive point (TRP) of a plurality of TRPs, in communication with the UE, in a multi-TRP configuration, a downlink control information (DCI) communication in a particular control resource set (CORESET) or a particular search space set; and
identify, based at least in part on the particular CORESET or the particular search space set in which the DCI communication is received, a demodulation reference signal (DMRS) port for a scheduled physical downlink shared channel (PDSCH) associated with the particular CORESET or the particular search space set,
wherein the DMRS port is associated with one or more quasi co-location (QCL) relationships including a QCL relationship associated with one or more physical downlink shared channel (PDSCH) layers that are transmitted from a second TRP of the plurality of TRPs.

28. The non-transitory computer-readable medium of claim 27, wherein the DCI communication is a format 1_0 DCI communication, and wherein the DMRS port is a default DMRS port configured for the scheduled PDSCH.

29. An apparatus for wireless communication, comprising:
means for receiving, from a first transmit receive point (TRP) of a plurality of TRPs, in communication with the apparatus, in a multi-TRP configuration, a downlink control information (DCI) communication in a particular control resource set (CORESET) or a particular search space set; and
means for identifying, based on the particular CORESET or the particular search space set in which the DCI communication is received, a demodulation reference signal (DMRS) port for a scheduled physical downlink shared channel (PDSCH) associated with the particular CORESET or the particular search space set,
wherein the DMRS port is associated with one or more quasi co-location (QCL) relationships including a QCL relationship associated with one or more physical downlink shared channel (PDSCH) layers that are transmitted from a second TRP of the plurality of TRPs.

30. The apparatus of claim 29, wherein the DCI communication is a format 1_0 DCI communication, and wherein the DMRS port is a default DMRS port configured for the scheduled PDSCH.

* * * * *